United States Patent [19]

Muramatsu et al.

[11] Patent Number: 4,760,718

[45] Date of Patent: Aug. 2, 1988

[54] WHEEL LOCK FOR VEHICLES

[75] Inventors: Yasuyuki Muramatsu, Iwata; Shoji Nakamichi, Hamakita, both of Japan

[73] Assignee: Kabushiki Kaisha Aiaishi d/b/a IIC, Ltd., Iwata, Japan

[21] Appl. No.: 904,509

[22] Filed: Sep. 5, 1986

[30] Foreign Application Priority Data

Sep. 6, 1985 [JP] Japan .............................. 60-1970133

[51] Int. Cl.⁴ ............................................ E05B 73/00
[52] U.S. Cl. ............................................ 70/18; 70/49
[58] Field of Search .................................. 70/14–15, 70/18, 30, 49, 57–58, 60–62, 93, 227, 233; 16/380

[56] References Cited

U.S. PATENT DOCUMENTS

| 3,747,376 | 7/1973 | White | 70/18 |
| 3,748,876 | 7/1973 | Mathews | 70/18 |
| 3,933,015 | 1/1976 | Balicki | 70/49 |
| 3,959,995 | 6/1976 | Fletcher | 70/18 |

Primary Examiner—Robert L. Wolfe
Attorney, Agent, or Firm—Ernest A. Beutler

[57] ABSTRACT

A wheel lock for a vehicle comprising a plurality of rigid members that are articulated to each other and which have a lockable connection at the outer ends so as to form a closed loop that may be employed for locking the wheel to an associated element.

7 Claims, 4 Drawing Sheets

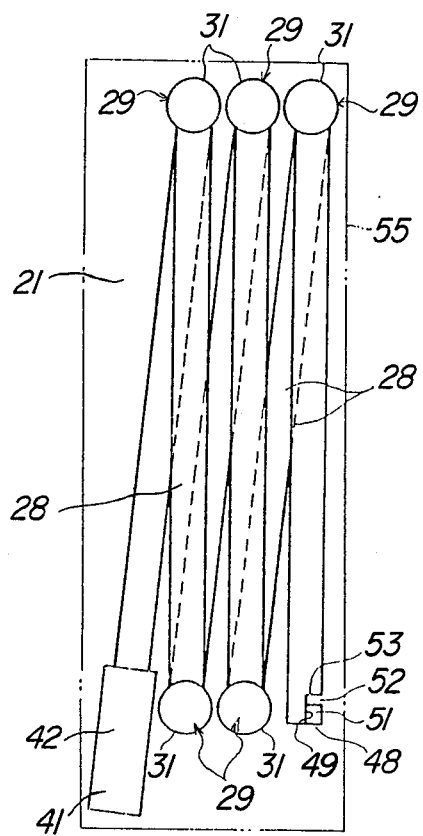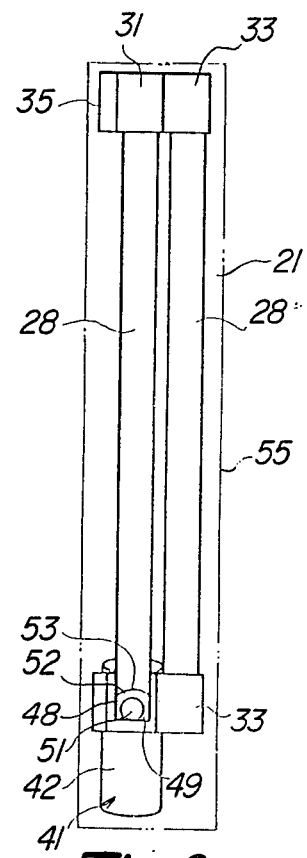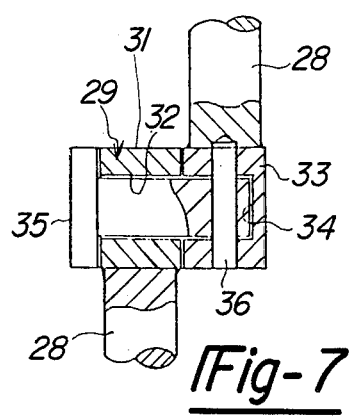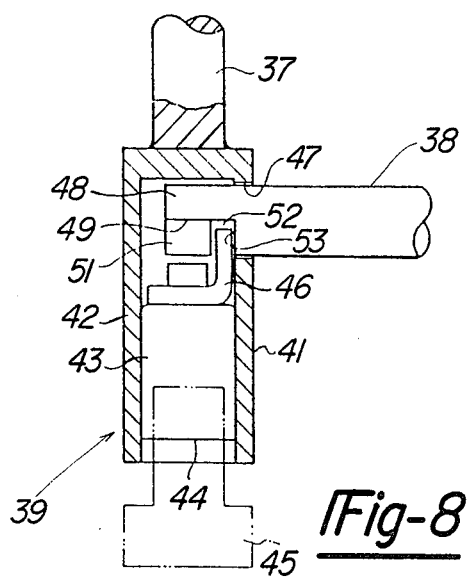

WHEEL LOCK FOR VEHICLES

BACKGROUND OF THE INVENTION

This invention relates to a wheel lock for vehicles and more particularly to an improved, simplified and highly effective arrangement for locking a vehicle wheel.

There are certain classes of vehicles which are relatively small and light in weight. With such vehicles, even though they may embody some form of ignition system lock or other lock, it is desirable also to provide an arrangement for locking the wheel of the vehicle against rotation either to another component of the vehicle or to a fixed element so as to prevent theft. Such a lock should be capable of being carried conveniently on the vehicle or by the operator and yet should be effective to insure that the wheel of the vehicle can be securely locked.

It is, therefore, a principal object of this invention to provide an improved lightweight, compact and highly effective lock for the wheel of a vehicle.

It is a further object of this invention to provide a vehicle lock that will be effective to lock a vehicle wheel and which may be conveniently stored and carried.

SUMMARY OF THE INVENTION

This invention is adapted to be embodied in a wheel lock for vehicles and comprises a plurality of rigid members that are articulated to each other at adjacent ends. At least two of the members are detachably connected to each other so as to permit the members to be inserted through an opening in a wheel and around another element for restraining the wheel relative to the other element.

BRIEF DESCRIPTION OF THE DRAWINGS

FIG. 5 is a top plan view of the locking device shown in a storage position.

FIG. 6 is a side elevational view of the locking device in its storage position.

FIG. 7 is an enlarged cross-sectional view showing one of the articulated joints of the locking mechanism.

FIG. 8 is an enlarged cross-sectional view showing the locking portion of the locking device.

DETAILED DESCRIPTION OF THE PREFERRED EMBODIMENTS

Figure 1:
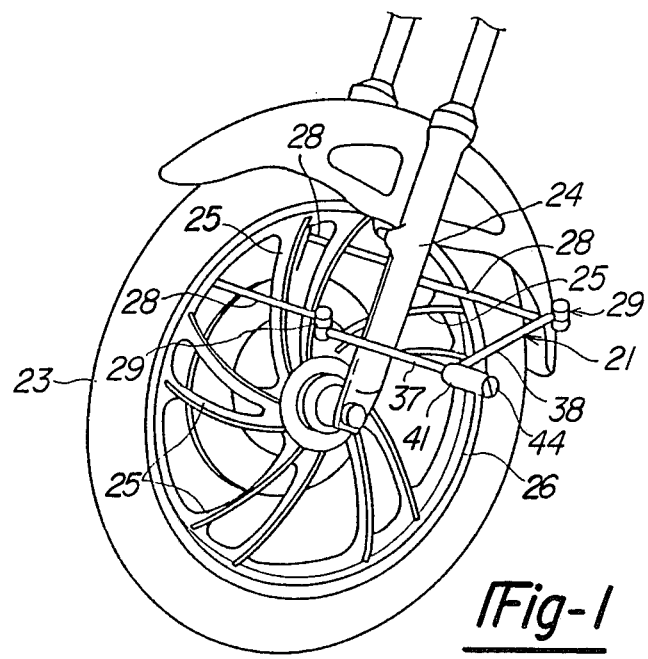
FIG. 1 is a perspective view showing the front wheel of a motorcycle associated with a wheel lock constructed in accordance with a first embodiment of the invention wherein the wheel is locked to the motorcycle.
Figure 2:
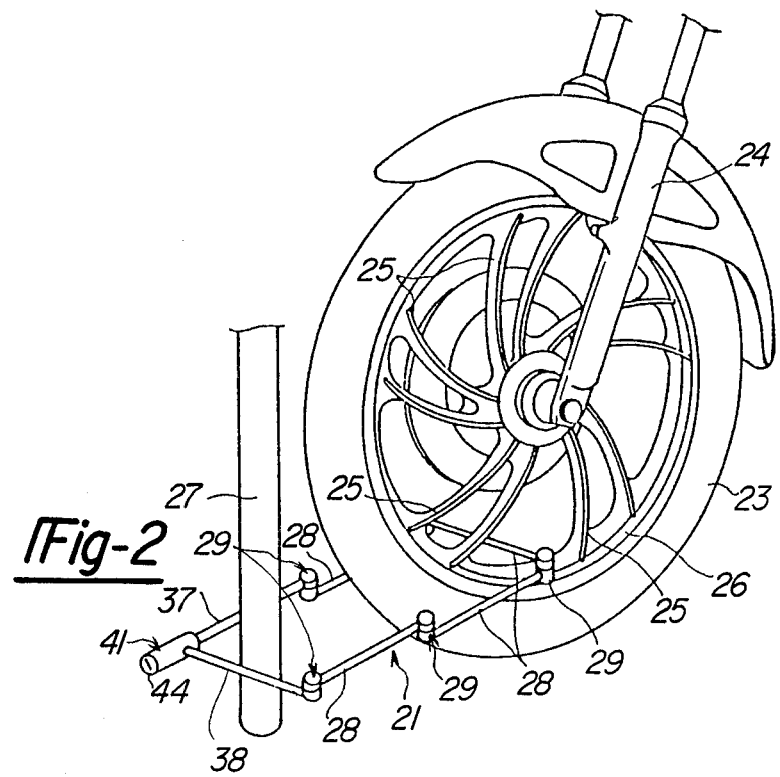
FIG. 2 is a perspective view, in part similar to FIG. 1, showing the motorcycle being locked to a fixed object.
Figures 3, 4:
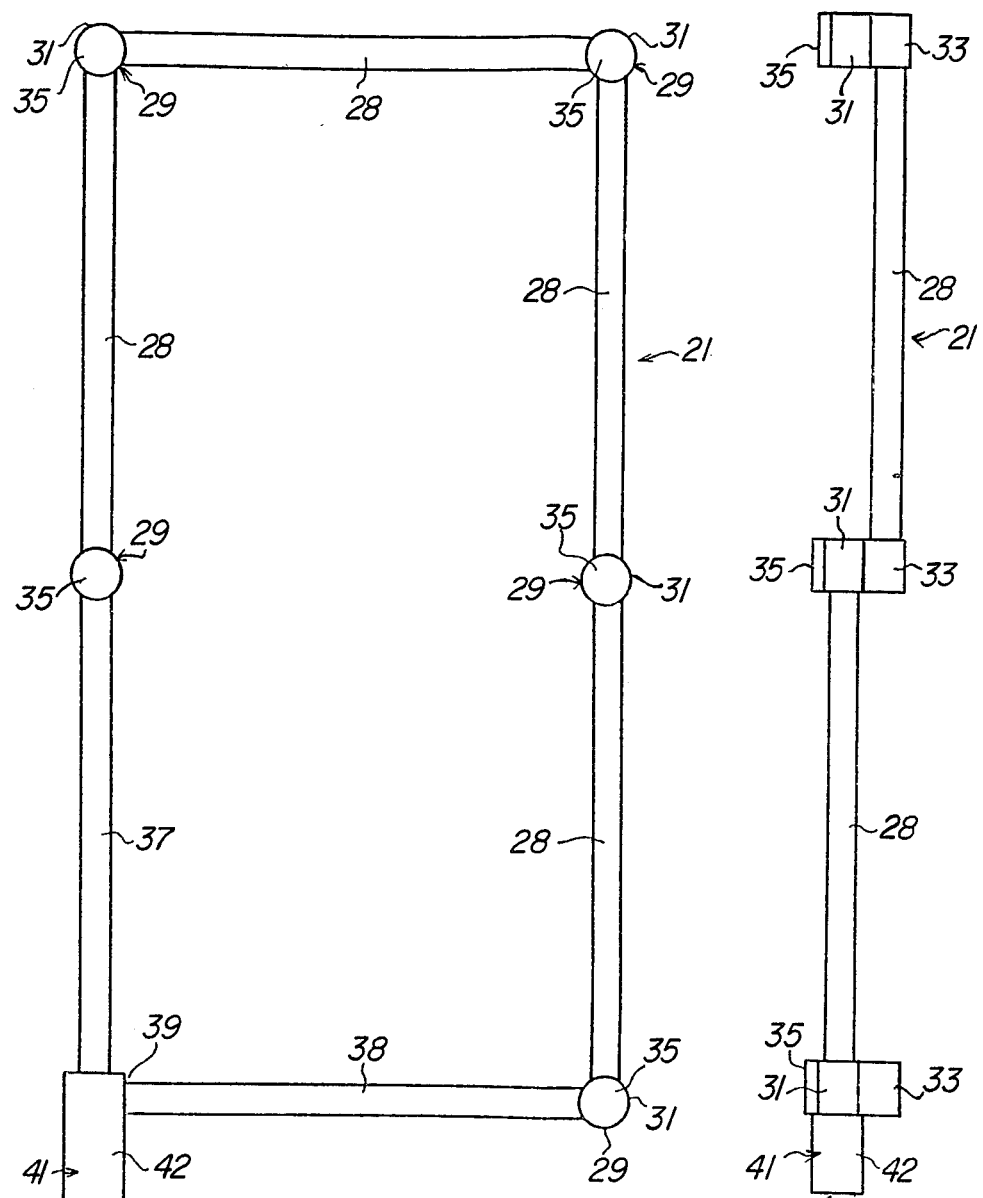
FIG. 3 is a top plan view of the locking device as shown in an operative position.
FIG. 4 is a side elevational view of the locking device.

Referring first to FIGS. 1 and 2, a locking mechanism constructed in accordance with a first embodiment of the invention is identified generally by the reference numeral 21. The locking device 21 is particularly adapted for locking a wheel 22 of an associated vehicle (shown only partially) against rotation and, if desired, for locking the wheel and associated vehicle to a fixed object. In the illustrated embodiment, the wheel 22 may comprise a front wheel of a motorcycle and which mounts a tire 23 of any known type. The wheel 22 and tire 23 are, in the illustrated embodiment, rotatably journaled by means of a front fork 24 that is connected to the remainder of the motorcycle in a known manner. The wheel 22 is formed of a hub portion that is connected by means of a plurality of cast spokes 25 to a rim portion 26. In the illustrated embodiment, the wheel is of the cast type. It should be readily apparent, however, that the invention may be utilized in conjunction with other types of wheels such as wire wheels or stamped wheels that have a plurality of circumferentially spaced openings that are defined in the illustrated wheel between the spokes 25.

The locking device 21 is adapted to lock the wheel against rotation reltive to the fork 24 as shown in the illustration of FIG. 1 or relative to a fixed element such as a pole 27 as shown in FIG. 2. The locking device 21 is shown in most detail in FIGS. 3 through 8 and will now be described in detail by particular reference to those figures in addition to the figures already referred to.

The locking device 21 is comprised of a plurality of substantially rigid members 28 which in this embodiment have a generally cylindrical configuration and may be formed from a suitable material such as a hardened tool steel, carbon steel or chromium-molybdenum steel so that they cannot be easily severed. Adjacent ends of the rigid members 28 are pivotally connected to each other by means of a pivot connection, indicated generally by the reference numeral 29 and having a construction as best shown in FIG. 7. Referring now specifically to this figure, this pivotal connection is comprised of a first bushing member 31 that is affixed, as by butt welding, to one end of one of the members 28 and which defines a cylindrical through bore 32. A second bushing member 33 is affixed, as by butt welding, to the adjacent end of the other rigid member 28 and is formed with a bore 34 which extends through only one side of the bushing 33. A headed pin 35 extends through the bores 32 and 34 and is fixed relative to the bushing 33 by means of a hardened steel pin 36. As a result, the rigid members 28 may be pivoted by the pivotal connection 29 through 360 degrees relative to each.

In addition to the rigid members 28, there are provided a pair of rigid end members 37 and 38. One end of each of the end members 37 and 38 is pivotally connected to an adjacent rigid member 28 by a pivotal connection 29 of the type previously described. The other ends of the end members 37 and 38 are adapted to be rigidly affixed to each other by means of a locking member, indicated generally by the reference numeral 39 and shown in most detail in FIG. 8.

The locking member 39 includes a lock 41 that is carried by the end of the end member 37 opposite to the pivotal connection 29. The lock 41 includes a cylindrical outer housing 42 that is open at one end and which opening is closed by a tumbler mechanism 43 having a key slot 44 for receiving an operating key 45. A latching or locking pawl 46 is operated by the tumbler mechanism 43 under the operation of the key 45 and is rotatable between a locked position as shown in FIG. 8 and an unlocked position.

The cylindrical housing 45 also has a circular opening 47 that is adapted to receive one end of the end member 38. The end member 38 has a projecting locking portion 48 that is formed with a flat 49 and locking projection 51 which define a recess 52 with an oppositely facing surface 53 of the member 38. The locking pawl 45 is adapted to enter into this recess so as to lock the members 37 and 38 together as shown in FIG. 8. Rotation of the locking pawl 46 will move it free of the recess 52 and permit removal of the end member 38 so as to unlock the device.

When the device and specifically the locking mechanism 39 is unlocked, the rigid elements 28 and end elements 37 and 38, which all preferably have the same shape, may be folded into a very compact position as shown in FIGS. 5 and 6 for storage within an outer protective housing 55. This housing 55 may be conveniently carried by the user or may be carried in a suitable manner in the associated motorcycle when the locking device 21 is not in use. When it is desired to lock the front wheel, the locking device 21 is inserted so that the end member 38 passes through the opening defined between the adjacent spokes 25 and is looped around and either locked around the front fork 24 or a rigid member 27 such as the post. The end of the end member 38 is then inserted into the opening 47 of the cylindrical member 42 and the locking pawl 46 is rotated to the locking position by the key 45. The key 45 is then withdrawn so that the device will be locked. The method of unlocking appears to be obvious and description of it is not believed to be necessary.

Figure 9:
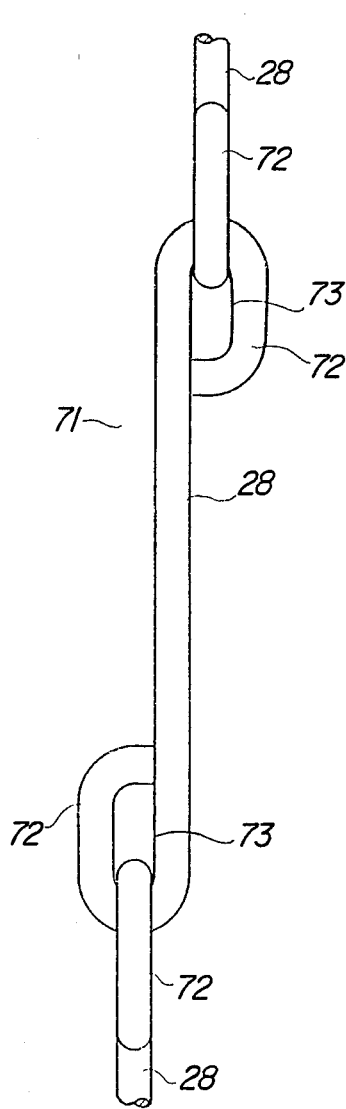
FIG. 9 is a top plan view of a locking device having an articulated joint constructed in accordance with another embodiment of the invention.
Figure 10:
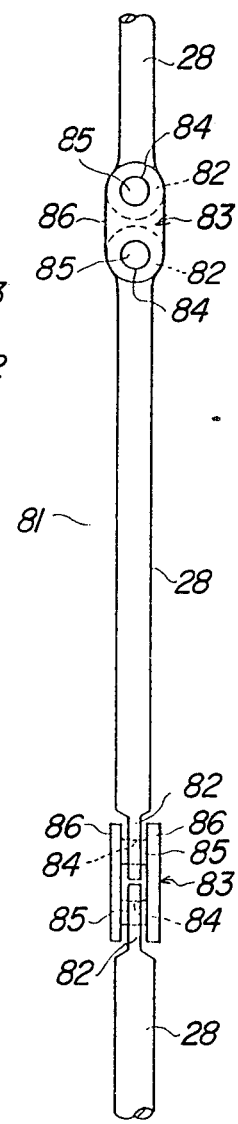
FIG. 10 is a side elevational view of a locking device incorporating another form of articulated connection.
Figure 11:
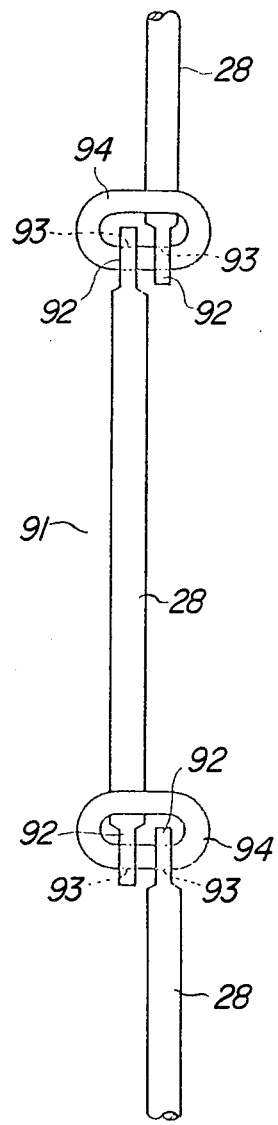
FIG. 11 is a view, in part similar to FIGS. 9 and 10, showing another form of articulated connection.

FIGS. 9 through 11 show three additional embodiments of the invention wherein only the articulated connections between the rigid members and the end members differ. Because of this, only these portions of the connections have been shown and the rigid members have been identified by the same reference numerals.

A first alternative embodiment of locking mechanism is identified generally by the reference numeral 71 and is shown in FIG. 9. In this embodiment, the rigid members 28 and the end members (which are not shown) are formed from rods of metal and have looped end portions 72 that define openings 73 that receive the corresponding looped portions 72 of the adjacent members so as to form an articulated connection between the members 28. Similar connections are formed between the ends of the members 28 and the end members 37 and 38 with a locking mechanism of the previously disclosed type being provided between the opposite ends.

Another embodiment is shown in FIG. 10 and is identified generally by the reference numeral 81. In this embodiment, the rigid members 28 also may be formed as rod sections and are formed with flattened end parts 82. A connecting member, indicated generally by the reference numeral 83, is provided for pivotally connecting the flattened portions 82. To this end, each of the flattened portions 82 is formed with a respective opening 84 that receives a pin 85 of the connecting member 83. The pins 85 are connected to cover plates 86 so as to form a pivotal joint between the flattened members 82 as should be readily apparent. A similar connection is provided between the ends of the rigid members 28 and one end of the end members 37 and 38.

Another embodiment of the invention is shown in FIG. 11 and is identified generally by the reference numeral 91. In this embodiment, the members 28 are formed as rods and have flattened end portions 92 in which openings 93 are formed. Closed links 94 extend through the respective opoenings 93 and provide the articulated connection between the members 28. As with the previously described embodiments, the rigid members 28 have similar articulated connection to the end members 37 and 38.

It should be readily apparent from the foregoing description that a number of embodiments of the invention have been illustrated and described and each of which provides a highly effective and yet relatively compact locking member that may be employed for locking the wheels of a vehicle such as a motorcycle or the like. Although a number of embodiments of the invention have been illustrated and described, various changes and modifications may be made without departing from the spirit and scope of the invention, as defined by the appended claims.

We claim:

1. A wheel lock for a vehicle wheel having at least one opening, said lock comprising a plurality of rigid rod shaped members pivotably connected to each other at adjacent ends by a pivot connection, said rod shaped members having a cylindrical portion formed at at least one of their ends, said pivotal connections including a pivot pin which is concealed within the adjacent cylindrical ends of said rod members to prevent attack, at least two of said rod members being detachable connected to each other so as to permit said members to be inserted through an opening in a wheel and around another element for restraining said wheel relative to said other element.

2. A wheel lock as set forth in claim 1 wherein the rigid members are connected by the detachable connection so as to form a closed loop extending around the wheel and the other element.

3. A wheel lock as set forth in claim 1 wherein the pivotal connections are such that the rigid members may be adjacent to each other to a collapsed condition.

4. A wheel lock as set forth in claim 3 wherein the rigid members are connected by the detachable connection so as to form a closed loop extending around the wheel and the other element.

5. A wheel lock as set forth in claim 4 wherein the detachable connection of two of the members to each other is afforded by a locking element.

6. A wheel lock as set forth in claim 5 wherein the detachable connection comprises a cylindrical element carried by one of said members, said cylindrical element having an opening therein for receiving an end of another of said rigid members and locking means for locking said end in said opening.

7. A wheel lock as set forth in claim 6 wherein the detachably connected rigid members extend at a right angle to each other when connected.

* * * * *